May 8, 1945.  J. BERGER ET AL  2,375,614
HOSE CONDUIT
Filed Oct. 20, 1939
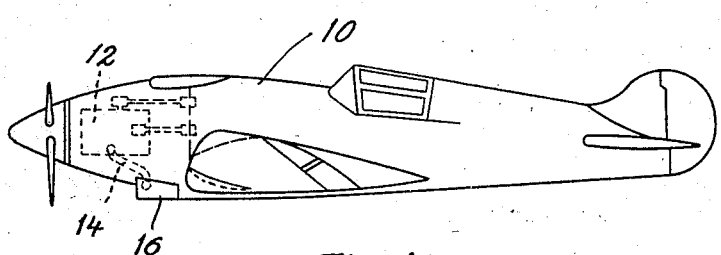
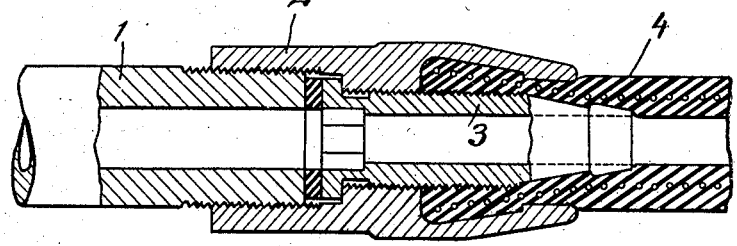
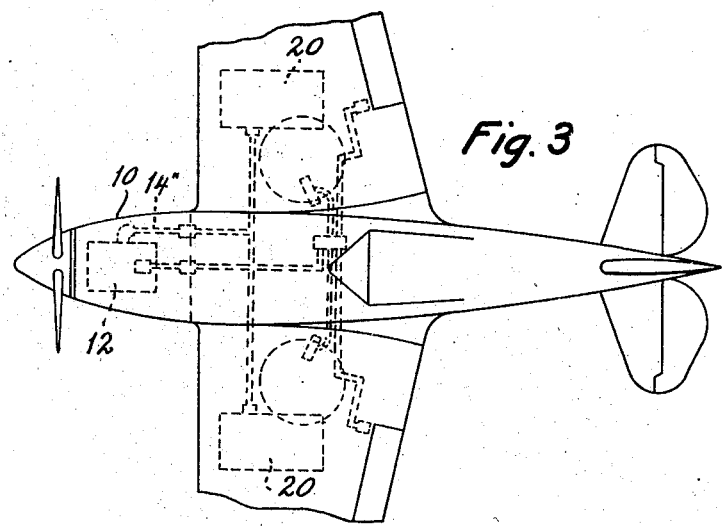
Inventors
Julius Berger, Peter Hirsch
By E. A. C...
Agent Patented May 8, 1945

2,375,614

UNITED STATES PATENT OFFICE 2,375,614

HOSE CONDUIT

Julius Berger, Berlin-Wilhelmsruh, Germany, and Peter Hirsch, New York, N. Y., assignors to Michigan Patents Corporation, Jackson, Mich.

Application October 20, 1939, Serial No. 300,340
In Germany November 24, 1938

1 Claim. (Cl. 174—47)

Our invention relates to a hose conduit intended especially for use in connection with flying machines or aircraft, the motor of which craft is supported elastically and is equipped with at least one hose conduit for the supply of fuel or oil from tanks housed in the cabin of the aircraft to the motor usually elastically or movably supported in rubber bearings. The use of bearings of this type causes the motor to be electrically insulated from other members of the flying machine, so that it can charge itself electrostatically during the flight in such a manner that an electric difference of potential of such strength may arise between the motor and the other members of the aircraft that hot sparks can occur.

This is detrimental and dangerous if the sparks take place at or near the fuel supply conduit. Experts have already become aware of that danger, and in order to obviate it have suggested designing the hose conduit in such a manner as to avoid from the beginning the formation of sparks. This result can be obtained, in fact, only in the hose conduit itself. If the motor is conductively connected with the cabin or if electrically conductive motor supporting bearings be used, there still exists the possibility that the fuel tank is electrically insulated, as for instance by intermediate layers of wood or a compressed artificial composition, and therefore the fuel supply conduit can still cause the production of sparks.

The same dangerous phenomena occurs not only with aircraft, but for instance also with tank plants if the vehicle to be tanked, may it be a motor car or motor vessel, has a different electrical charge from that of the tank or its conduit.

As the danger is greatest with aircraft, the problem of obviating the formation of sparks therewith has met with the greatest attention. In this respect two suggestions will be mentioned which try to solve the problem in opposite ways, viz.:

Such conduit or hose ordinarily has a metal reinforcing layer, this being usually a helically wound or woven wire embedded in the conduit; and, in accordance with the first of these solutions, it has been suggested to insert into the hose conduit establishing the communication between the motor and the tank housed in the cabin or in the wing of the aircraft means insuring a reliable electrical insulation, as for example means adapted to create an electrical gap between two adjacent electrically conductive and differently charged parts, the gap being sufficiently wide to prevent sparking from the wire over and across the gap even if the potential difference of the static charge be the greatest which may possibly arise. In accordance with the second solution, it has been suggested to conductively use the wire in the fuel supply conduit or flexible tube and to electrically conductively connect the ends of the wire at the ends of the tube with metal parts of the motor or with the aircraft cabin or other conductive parts.

The first of these prior solutions mentioned hereinabove necessitated the provision of an electrical insulating packing consisting for instance of a compressed artificial composition located within the hose conduit against the end of the hose and the reinforcing wire, the material being of sufficient width to prevent completely the formation or jumping of sparks. However, it is already quite difficult to obtain a reliable connection by an arrangement of hose coupling as will be hereinafter described in connection with the drawing, or by similar arrangement, and at the same time to insert an additional insulating packing at a predetermined location would render the assembly of the hose conduit still more complicated. Further, it must be considered that attendants may neglect to insert such additional packing. With the second suggested prior solution, it has been necessary to let the wire project out of the hose conduit at the ends thereof sufficiently to engage with and make a reliable contact with metallic parts of the coupling.

It will be obvious that to obtain reliable electrical conductive contact between couplings at the end of the flexible conduit, as required in previous hose conduits, very great care must be exercised when such members are assembled. Even then, the unimpeded passage of electrical current cannot be assured, and for this reason it has sometimes been suggested that the ends of the wire project beyond the ends of the rubber hose or conduit and be inserted into suitable bores provided in sleeve portions of the coupling, and that binding screws be then provided in these sleeve portions to securely clamp fast the ends of the wire in the bore.

The drawbacks from which the known hose conduits suffer, as stated, are entirely overcome in accordance with the present invention by manufacturing the hose conduit itself of an electrically conductive rubber or material. It is known that the insulating capacity or the conductivity of all types of rubber, be it natural or synthetic rubber, can be changed by various means. With natural rubber, the conductivity can be modified especially by varying the amount of soot or carbon added, whereas with synthetic rubber, that is rubber substitutes, the manner of manufacturing it also exerts a certain influence. In any event, additions of soot alone, even if the amounts are considerable, does not assure conductivity of the rubber because the conductivity may also be influenced for instance by the degree of polymerization or by the manner in which the vulcanization is carried out. Also the kind of raw materials chosen for the manufacture of the synthetic rubber can affect its conductivity, as certain hydrocarbons may be electrically conductive.

The invention has been shown by way of example in the accompanying drawing.

In the drawing, Figure 1 is a longitudinal cross sectional view of a hose conduit showing the tube and coupling connection in cross section, Fig. 2 is a side elevational view of an aircraft to which the present improvement has specific application, and Fig. 3 is a fragmentary plan view of the aircraft as shown in Fig. 2.

In the drawing, 1 denotes an exteriorly threaded metal tube projecting from the motor or other part and communicating with the supply conduit. An interiorly threaded sleeve 2 is adapted to be scewed upon tube 1, and has screw threads to screw upon an exteriorly threaded nipple 3. Sleeve 2 and nipple 3 serve as a coupling to connect the hose conduit 4 with the tube 1. According to our invention, the conduit 4 is a flexible hose of rubber or synthetic rubber or other conducting material. The conductivity of this conduit or hose 4 must be high enough to prevent formation of sparks.

In Figs. 2 and 3 is shown a diagrammatic representation of an aircraft 10, having an engine 12, which is more or less electrically insulated from other structural and operating parts of the aircraft. A flexible hose according to the present invention is shown electrically connected to the engine 12 with the oil cooler 16. A similar hose 14" is shown electrically connecting the engine 12 with the gas tanks 20, housed in the wings of the aircraft 10. No attempt has been made to illustrate all the places in which flexible hose according to the present invention may be used in aircraft constructions for electrically connecting parts of the aircraft which are apt to act as condensers of electric charges.

Thus, the conductive hose will establish a conductive connection between the sleeves 2 and 3 at each end of the conduit 4.

The invention presents the advantage over all prior hose constructions that when the members constituting the hose conduit are assembled no manipulations need be carried out, the success of which cannot be guaranteed. Nevertheless, the formation of sparks in the neighborhood of the fuel mixture is reliably prevented. A hose in accordance with this invention may suitably be used also for oil conduits and conduits for other agents as such conduits are frequently located near air enriched with fuel gases and like inflammable and explosive vapors.

What we claim is:

A hose conduit for connection between parts of vehicles in which use the conduit and connections are subjected to extreme vibrations with likelihood of parts of the vehicle acting as condensers of electrical charges of different potential comprising in combination, a flexible fluid conducting hose in the form of a tube having a yieldable wall of rubberlike material of inherently sufficient electrical conductivity throughout its length and wall thickness from the inner to the outer sides of the hose to enable the tube to be classified as an electrical conductor, electrically conductive metallic connections at each end of the fluid conducting hose, each of said connections having an inner nipple fitted for an appreciable distance within the opening at one end of the hose and having an outer sleeve electrically conductively connected on the nipple and fitted embracingly and clampingly around an appreciable length of the end of the fluid conducting hose having the nipple therein, whereby a portion of the nipple and the sleeve receive and clamp the hose wall therebetween with the nipple and sleeve defining a constricted annular chamber in which the end of the hose is confined instead of being free to flow axially and in which confinement the hose is in close contact with the walls of the annular chamber of both the inner and outer members of the conductive metallic connection.

JULIUS BERGER.
PETER HIRSCH.